Aug. 10, 1965    L. C. CHOUINGS    3,199,926
VEHICLE BRAKES
Filed May 2, 1963    2 Sheets-Sheet 1
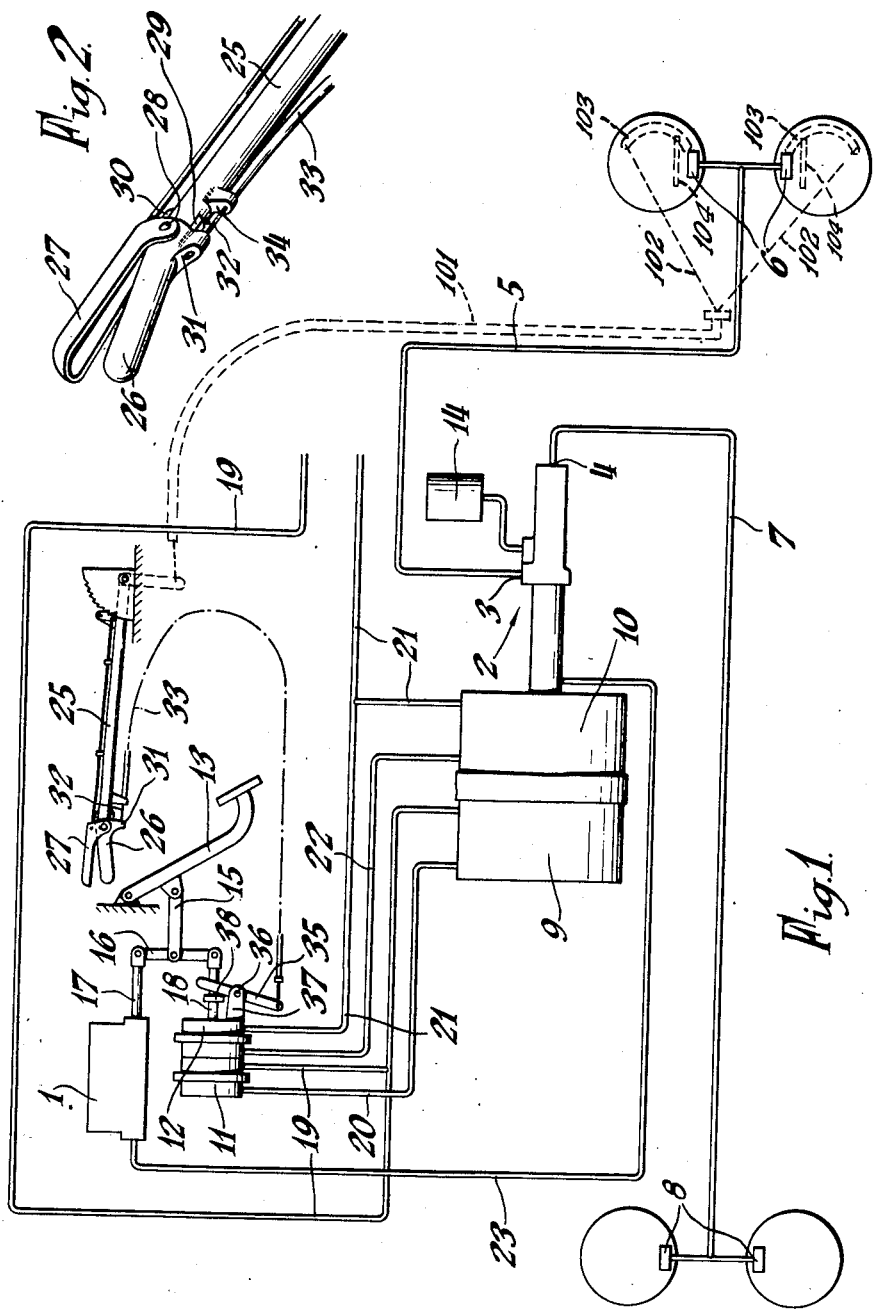
INVENTOR
BY Leslie C. Chouinge
Lawrence J. Winter
ATTORNEY

United States Patent Office 3,199,926
Patented Aug. 10, 1965

3,199,926
VEHICLE BRAKES
Leslie C. Chouings, Leamington Spa, England, assignor to Automotive Products Company Limited, Warwickshire, England
Filed May 2, 1963, Ser. No. 277,645
Claims priority, application Great Britain, May 3, 1962, 17,058/62
4 Claims. (Cl. 303—2)

This invention relates to brakes for vehicles and has for its object to provide an arrangement by means of which power assistance is available to assist the brakes operable mechanically by the hand brake mechanism of the vehicle and upon operation of the hand brake.

According to the invention, in the braking system of a vehicle a servo-device is included for providing power assistance to the brakes mechanically operable by the hand brake, the actuation of the servo-device to provide the power assistance being dependent upon operation of control means actuated by a driver operated control jointly with the hand brake lever by the driver of the vehicle.

In, for example, a fluid pressure braking system incorporating a fluid pressure servo-device for providing power assistance during normal operation of the brakes some of which are adapted for mechanical operation by the hand brake lever of the vehicle, the valve means controlling operation of the servo-device and normally operable upon actuation of the foot pedal is also adapted to be operable independently of the foot pedal by an operator control actuated jointly with the hand brake lever so that when the hand brake lever is operated to apply the brakes mechanically, the said valve means is operated to permit operation of the servo-device to apply power assistance to the mechanically operated brakes. The valve means can for example be operatively connected to the hand brake lever ratchet release arm, the operation of the ratchet release arm to free the hand brake lever resulting in operation of the valve means.

Whilst the arrangement of the present invention can be incorporated in any fluid pressure braking system including servo-means for providing power assistance to the brakes the same is particularly suitable for incorporation in a fluid pressure braking system in which valve means controlling operation of a fluid pressure servo-device is arranged externally of the servo-device, as with such systems the adaptation of the valve means for operation by the control means is simpler than with systems in which such valve means is arranged within the servo-device. The arrangement according to the invention can therefore be incorporated in for example braking systems disclosed in my copending U.S. applications Serial No. 177,416 filed March 5, 1962, and Serial No. 263,198 filed March 6, 1963. Accordingly, an embodiment of the invention as applied to a braking system of the kind disclosed in the specification of my U.S. application Serial No. 177,416 filed March 5, 1962, will now be described by way of example and with reference to the accompanying drawings in which:

FIGURE 1 shows diagrammatically the layout of a vehicle braking system incorporating the features of the present invention;

FIGURE 2 is an enlarged perspective view of part of the hand-brake lever shown in FIGURE 1;

Figure 3:
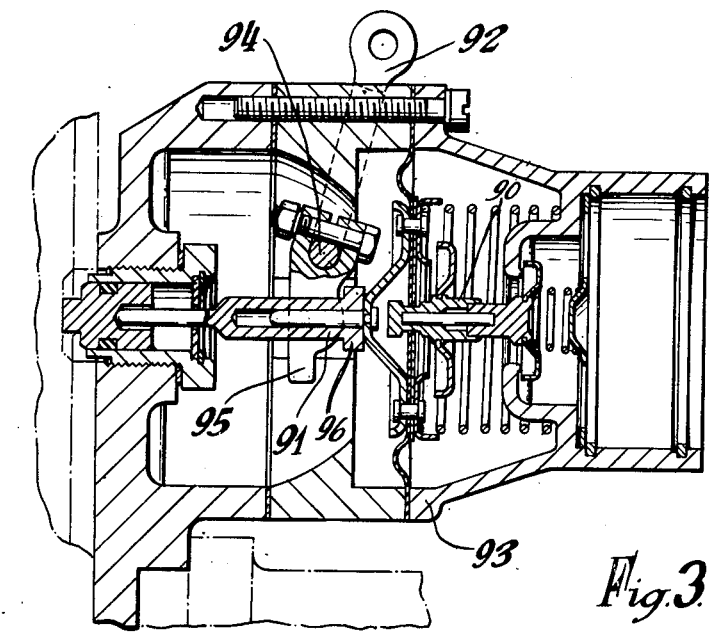
FIGURE 3 shows in section a modified construction of valve-device for controlling operation of a servo-device.

In the braking system shown diagrammatically in FIGURE 1 of the drawings hydraulic liquid from a pedal operated master cylinder 1 is supplied to a second master cylinder 2 having separate outlets 3 and 4. The outlet 3 is connectable by a pipe line 5 to the wheel cylinders 6 of the brakes on one axle of the vehicle the other outlet 4 being connectable by a pipe line 7 to the wheel cylinders 8 of the brakes on the other axle of the vehicle. The second master cylinder 2 is associated with a servo-unit incorporating two servo-devices 9 and 10 connected to separate sources of fluid pressure either positive or negative and independently operable by actuation of two valves associated with the foot pedal 13 of the master cylinder 1 and arranged so as to be operated in sequence. The arrangement is such that hydraulic liquid supplied to the second master cylinder 2 from the pedal operated master cylinder 1 through a pipe line 23 is delivered by one of the pipe lines to the wheel cylinders connected thereto to operate the brakes on the one axle. The hydraulic liquid also effects operation of the second master cylinder 2 to supply hydraulic liquid from a separate source of supply 14 connected to the master cylinder to the other pipe line whereby the wheel cylinders connected thereto are actuated and the brakes of the other axle operated. Operation of the foot pedal also effects mechanical actuation of the two valves 11, 12 such actuation of the valves resulting in operation of the servo-devices 9, 10 to apply servo-assistance to the second master cylinder 2.

The foot pedal 13, which is of the pendant type, is connected by a connecting rod 15 to a lever 16 intermediate its length, one end of which is connected to the piston rod 17 of the pedal operated master cylinder 1. The other end of the lever 16 is connected to the operating member 18 of the valve 12, referred to as the first valve which is arranged in tandem with the other valve 11, herein referred to as the second valve. The servo-devices 9 and 10 are of the fluid pressure differential type and each valve controls the connection of the working chamber of the associated servo-device to, for example a source of suction or atmosphere. The arrangement is such that when the foot pedal is operated to apply the brakes both valves are operated through the connection between the lever and the operating member of the first valve to connect the working chamber of each servo-device to atmosphere so that the servo-devices operate jointly to provide power assistance to the second master cylinder and consequently to the brakes.

The servo-device 9 and associated valve 11 can be connected to a source of vacuum by pipe line 19, the valve 11 also being connected to the servo-device by a pipe line 20. Similarly the servo-device 10 and associated valve 12 can be connected to a source of vacuum by pipe line 21, this valve also being connected to the servo-device 10 by a pipe line 22.

Mechanical operation of the brakes is effected by a hand brake lever 25 which incorporates an operator control which is operable jointly with the hand brake lever to actuate the valves 11 and 12 when the same is operated to apply the brakes. As shown in FIGURE 2, the operator control is provided by a hand grip 26, which forms an extension to the hand brake lever 25, the usual ratchet release arm 27 of the hand brake being pivotally mounted on the hand grip. The hand grip 26 is pivotally mounted on the brake lever 25. The hand grip 26 has an anchorage 31 for the attachment of one end of the core 32 of a flexible cable, the adjacent end of the casing 33 of which is also anchored. The opposite end of the cable core 32 is anchored to one end of an arm 35 pivotally mounted intermediate its ends on a pivot pin 36 carried by a bracket 37 supported by the casing of the valve 12. The opposite end of the arm 35 is forked and embraces the operating member 18 of valve 12 the said forked end being engageable with a collar 38 on the operating member 18. With the hand brake lever 25 in the off position, as shown in FIGURE 1, the hand grip 26 lies out of alignment with the hand brake lever 25. When the hand grip 26 is grasped to operate the hand brake, the ratchet release arm is actuated to release the ratchet, the initial pull on the hand brake lever resulting in pivotal movement of the hand grip. The pivotal movement of the hand grip 26 resulting from the initial pull on the hand brake lever 25 applies a pull to the cable core 32 which results in anti-clockwise turning movement (FIGURE 1) of the arm 35 so that the valve operating member moves to the left (FIGURE 1) and the valves 11 and 12 operate to effect actuation of the servo-devices 9 and 10.

The hand brake lever applies the brakes 6 mechanically through a conventional linkage which has a Bowden cable 101 connected by separate cables 102 to levers 103 in the brakes, the said levers being each pivoted to one shoe of the brake and acting through a stub 104 on the other shoe. The operation of the valves 11 and 12, by actuating the servomotors, causes liquid pressure to be created in the second master cylinder 2 to provide simultaneously liquid pressure operation of the brakes on both axles. Thus, when the brakes are mechanically operated by the hand brake lever 25, they are also applied by liquid pressure with servo assistance.

In the above described braking system, the valves 11 and 12 are mechanically operated by the foot pedal 13 and accordingly must be installed in close proximity to the brake pedal 13 and the pedal operated master cylinder 1. Also the two servo-devices 9 and 10 of the servo-unit are associated with a single master cylinder 2.

The arrangement of the present invention can be adapted to control a single valve controlling operation of a single servo-device. One such arrangement is shown in FIGURE 3 wherein the movable member indicated generally at 90 of the valve is displaced by axial movement of a push rod 91 actuated by a lever 92 pivotally mounted on the valve casing 93. The lever 92, located externally of the casing 93 is secured by one end to the outer end of a rocker shaft 94, the inner end of which extends into the valve casing and carries a forked rocker 95. The forked rocker 95 engages a shoulder 96 on the push rod 91 which is mounted in the valve casing 93 so as to be slidable axially in a direction at right angles to the axis of the rocker shaft. The outer end of the lever 92 is connectable by a flexible cable to the operator control operable jointly with the hand brake lever so that when the operator control is operated upon actuation of the hand brake lever the forked rocker 95 is turned in a direction to cause axial movement of the push rod 91 from a retracted position to in turn, effect operation of the movable valve member 90 of the valve.

The valve shown in the drawings are of the diaphragm type and valves of this type are well known for the control of air of vacuum servo-devices. For the purpose of the present invention however the valves are adapted for mechanical operation by the hand control associated with the hand brake lever.

Instead of providing a separate operator control such as the hand grip 26 the ratchet release lever of the hand brake can be used as the operator control.

I claim:
1. A servo operated fluid pressure braking system for vehicles comprising separate fluid pressure brake circuits for the front and rear wheel brakes of a vehicle, master cylinder means for supplying fluid under pressure to said separate brake circuits, separate servo devices independently operable of each other and each operatively connected to said master cylinder means to supply fluid to said brake circuits, a separate valve operatively connected to each said servo device for controlling the respective operation thereof, foot pedal means operatively connected to each said valve for actuating it to control operation of its respective servo device, and hand brake means operatively connected to each said valve for actuating it and simultaneously actuating said servo devices to control operation of its respective servo device to provide servo assistance when said hand brake means is applied.

2. The braking system of claim 1 wherein said hand brake means consists of a hand brake lever connected to each said valve by a flexible cable.

3. The braking system of claim 2 wherein said hand brake lever is connected to a brake circuit by a mechanical linkage means.

4. The braking system of claim 2 wherein said hand brake means comprises a hand grip mounted on a hand brake lever for selective operation for movement relative to said lever at one time, and for movement with said lever at another time.

References Cited by the Examiner

UNITED STATES PATENTS 3,036,869   5/62   Crockett _____ 303—2

FOREIGN PATENTS 642,515   7/37   Germany.

FERGUS S. MIDDLETON, *Primary Examiner.*